United States Patent
Roberts et al.

(10) Patent No.: US 9,794,631 B2
(45) Date of Patent: Oct. 17, 2017

(54) SYSTEMS AND METHODS FOR FACILITATING PLANNING OF A FUTURE MEDIA CONSUMPTION SESSION BY A USER OF A MEDIA PROGRAM DISTRIBUTION SERVICE

(71) Applicant: Verizon and Redbox Digital Entertainment Services, LLC, Basking Ridge, NJ (US)

(72) Inventors: Brian F. Roberts, Dallas, TX (US); Christina S. Siegfried, Irving, TX (US); Ann Gordon Prather, Dallas, TX (US); Brandon N. Wright, Irving, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 619 days.

(21) Appl. No.: 14/142,003

(22) Filed: Dec. 27, 2013

(65) Prior Publication Data

US 2015/0019965 A1 Jan. 15, 2015

Related U.S. Application Data

(60) Provisional application No. 61/846,603, filed on Jul. 15, 2013.

(51) Int. Cl.
*H04N 21/472* (2011.01)
*H04N 21/466* (2011.01)
(Continued)

(52) U.S. Cl.
CPC ......... *H04N 21/472* (2013.01); *G06F 3/0482* (2013.01); *G06F 3/0484* (2013.01);
(Continued)

(58) Field of Classification Search
CPC ............ H04N 21/482; H04N 21/4826; H04N 21/472; H04N 21/431; H04N 21/4668;
(Continued)

(56) References Cited

U.S. PATENT DOCUMENTS 7,756,753 B1 * 7/2010 McFarland ............ G06Q 30/02
705/26.1
8,041,454 B2 * 10/2011 Blust .................... G06Q 10/087
700/232
(Continued)

FOREIGN PATENT DOCUMENTS

WO     WO 03104940 A2 * 12/2003  ......... H04N 5/44543

OTHER PUBLICATIONS

TV Tropes, Just for Fun: X Meets Y, Aug. 16, 2012, http://tvtropes. org, retrieved with Internet Archive Wayback Machine http://web. archive.org.*

(Continued)

*Primary Examiner* — Nicholas Ulrich

(57) ABSTRACT

An exemplary method includes a media service provider system providing a browse view for display on a display screen associated with a user during a first media consumption session, detecting a selection by the user of a planning option, the selection of the planning option indicating that the user plans to consume at least one media program during a second media consumption session that is subsequent to the first media consumption session, presenting a user interface that allows the user to specify one or more parameters associated with the second media consumption session, detecting user input specifying the one or more parameters, identifying one or more media programs that are available for consumption by the user during the second media consumption session, and presenting listing information
(Continued)

associated with the identified one or more media programs. Corresponding systems and methods are also described.

20 Claims, 12 Drawing Sheets

(51) Int. Cl.

| | |
|---|---|
| *G06F 17/30* | (2006.01) |
| *G06F 3/048* | (2013.01) |
| *G06Q 20/18* | (2012.01) |
| *G11B 27/28* | (2006.01) |
| *H04N 9/79* | (2006.01) |
| *G11B 27/02* | (2006.01) |
| *H04N 21/47* | (2011.01) |
| *H04N 21/482* | (2011.01) |
| *G06Q 30/02* | (2012.01) |
| *G06F 3/0484* | (2013.01) |
| *H04L 29/06* | (2006.01) |
| *G06F 3/0482* | (2013.01) |
| *H04N 21/262* | (2011.01) |
| *H04N 21/458* | (2011.01) |
| *H04N 7/16* | (2011.01) |
| *H04N 21/2387* | (2011.01) |
| *H04N 21/6587* | (2011.01) |
| *H04N 21/25* | (2011.01) |
| *H04N 21/845* | (2011.01) |
| *H04N 21/8549* | (2011.01) |
| *H04N 5/76* | (2006.01) |

(52) U.S. Cl.
CPC .... *G06F 3/04842* (2013.01); *G06F 17/30861* (2013.01); *G06Q 20/18* (2013.01); *G06Q 30/0255* (2013.01); *G11B 27/02* (2013.01); *G11B 27/28* (2013.01); *H04L 65/601* (2013.01); *H04N 5/76* (2013.01); *H04N 7/163* (2013.01); *H04N 9/7921* (2013.01); *H04N 21/2387* (2013.01); *H04N 21/252* (2013.01); *H04N 21/26258* (2013.01); *H04N 21/26283* (2013.01); *H04N 21/458* (2013.01); *H04N 21/4668* (2013.01); *H04N 21/47* (2013.01); *H04N 21/47202* (2013.01); *H04N 21/47214* (2013.01); *H04N 21/482* (2013.01); *H04N 21/4825* (2013.01); *H04N 21/4826* (2013.01); *H04N 21/4828* (2013.01); *H04N 21/6587* (2013.01); *H04N 21/8456* (2013.01); *H04N 21/8549* (2013.01)

(58) Field of Classification Search
CPC .......... H04N 21/458; H04N 21/47214; G06Q 10/06314; G06Q 10/0631; G06Q 20/18; G06Q 10/087; G06F 3/0482; G06F 17/30828

See application file for complete search history.

(56) References Cited

U.S. PATENT DOCUMENTS

| | | | | |
|---|---|---|---|---|
| 9,164,979 B1* | 10/2015 | Dubey | ............... | G06F 17/27 |
| 2004/0172274 A1* | 9/2004 | Gross | ............... | G06Q 30/0645 |
| | | | | 705/307 |
| 2007/0122110 A1* | 5/2007 | Kawahara | ............... | H04N 5/445 |
| | | | | 386/297 |
| 2007/0261070 A1* | 11/2007 | Brown | ............... | G06F 3/0482 |
| | | | | 725/9 |
| 2008/0059884 A1* | 3/2008 | Ellis | ............... | H04N 5/44543 |
| | | | | 715/721 |
| 2009/0307719 A1* | 12/2009 | Clark | ............... | H04N 7/17318 |
| | | | | 725/32 |
| 2010/0057871 A1* | 3/2010 | Kaplan | ............... | G07F 9/026 |
| | | | | 709/206 |
| 2010/0296505 A1* | 11/2010 | Kissinger | ............... | G06Q 30/02 |
| | | | | 370/346 |
| 2011/0265126 A1* | 10/2011 | Rouse | ............... | H04N 5/765 |
| | | | | 725/61 |
| 2011/0282759 A1* | 11/2011 | Levin | ............... | G06Q 30/02 |
| | | | | 705/26.41 |
| 2011/0320318 A1* | 12/2011 | Patel | ............... | G06Q 30/02 |
| | | | | 705/26.62 |
| 2015/0066915 A1* | 3/2015 | Golder | ............... | G06F 17/30867 |
| | | | | 707/723 |

OTHER PUBLICATIONS

TV Tropes, X Meets Y: Film, Jun. 7, 2012, http://tvtropes.org, retrieved with Internet Archive Wayback Machine http://web.archive.org.*

Lagorio-Chafkin Christine, How to Master Your Elevator Pitch, May 24, 2010, http://www.inc.com.*

* cited by examiner

SYSTEMS AND METHODS FOR FACILITATING PLANNING OF A FUTURE MEDIA CONSUMPTION SESSION BY A USER OF A MEDIA PROGRAM DISTRIBUTION SERVICE

RELATED APPLICATIONS

The present application claims priority under 35 U.S.C. §119(e) to U.S. Provisional Patent Application No. 61/846,603, filed Jul. 15, 2013. The contents of the provisional patent application are hereby incorporated by reference in their entirety.

BACKGROUND INFORMATION

There are diverse ways for people to find and consume media programs. For example, a user wanting to watch a media program such as a movie may utilize a traditional video distribution service such as a video rental or purchase service ("video service") to find, access, and watch the movie. The video service may allow the user to rent or purchase a physical copy of the movie from a local video store or media vending kiosk, or to rent or purchase a digital copy of the movie through an online video service, which may stream or download the digital copy of the movie to a user computing device for playback to the user.

Such a video service typically provides a user of the service with tools for discovering and accessing a media program, such as user interface tools that provide information about the media program and facilitate access to the media program by the user. However, there remains room for new and/or improved user interface tools and/or features that may further benefit users of the service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
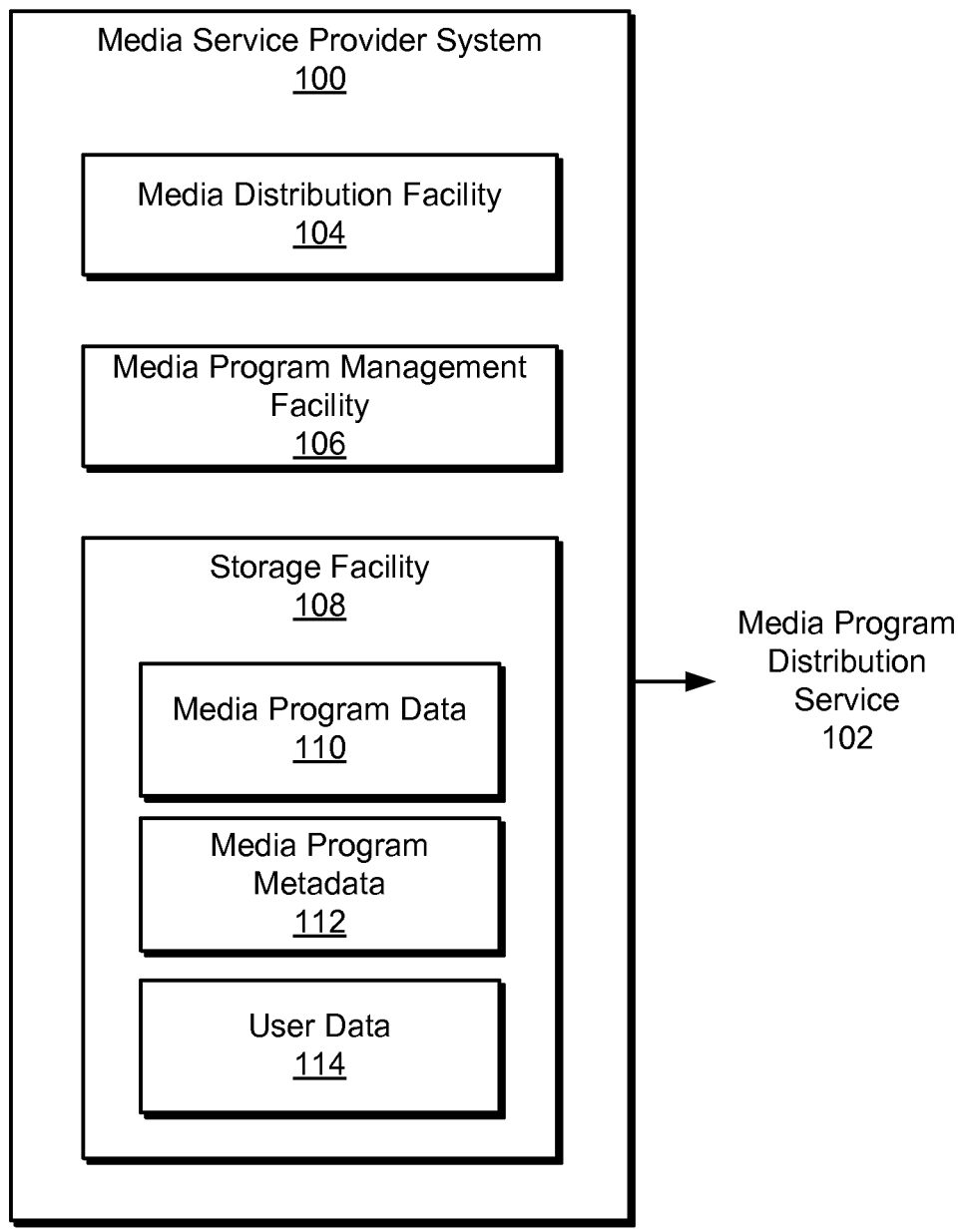
FIG. 1 illustrates an exemplary media service provider system according to principles described herein.

Exemplary systems and methods for facilitating planning of a future media consumption session by a user of a media program distribution service are disclosed. In certain examples, systems and methods described herein may be configured to provide one or more tools that allow a user to plan for future discovery and/or consumption of media programs provided by the media program distribution service, such as for consumption of media programs during a future time period (e.g., a day in the future) and/or during an event that will occur in the future. To this end, the systems and methods described herein may provide one or more tools that the user may use to specify one or more parameters associated with the future media consumption session.

For example, a media service provider system may provide a browse view for display on a display screen associated with a user during a first media consumption session. The browse view may be configured to display listing information associated with a plurality of media programs provided by a media program distribution service. While the browse view is being displayed, the media service provider system may detect a selection by the user of a planning option, which indicates that the user plans to consume at least one media program included in the plurality of media programs during a second media consumption session that is subsequent to the first media consumption session (i.e., during a future media consumption session). In response to the selection by the user of the planning option, the media service provider system may present a user interface that allows the user to specify one or more parameters associated with the second media consumption session. The media service provider system may then detect user input provided by the user by way of the user interface and that specifies the one or more parameters associated with the second media consumption session, identify, based on the one or more parameters specified by the user, one or more media programs included in the plurality of media programs and that are available for consumption by the user during the second media consumption session, and present, within the browse view during the first media consumption session, listing information associated with the identified one or more media programs.

As used herein, "listing information" associated with a media program may refer to any type of information representative of the media program and that may be presented within a browse interface associated with the media program distribution service. Such information may include, but is not limited to, a title of the media program, a rating of the media program, available formats of the media program, a description of the media program, a cover art image associated with the media program, etc. In some examples, the presence of listing information associated with a media program in a browse view may indicate that the media program is available for consumption by the user.

The systems and methods described herein may facilitate a convenient, intuitive, and/or efficient discovery by the user of media programs that are available for consumption during a particular media consumption session. These and/or additional or alternative benefits and/or advantages that may be provided by the systems and methods described herein will be made apparent herein.

FIG. 1 illustrates an exemplary media service provider system 100 ("system 100"). System 100 may be configured to facilitate discovery, access, and/or consumption of media programs by one or more users. For example, system 100 may be configured to provide a media program distribution service 102 ("media service 102") to one or more end-users of the media service 102 (e.g., one or more subscribers to the media service 102). System 100 may be associated with (e.g., operated by) a provider of the media service ("service provider"). Through the media service 102, an end user of the media service 102 may discover, access, and/or consume media programs distributed by system 100.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service 102. Such media programs that are made available for user consumption by the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a media program management facility 106 ("management facility 106"), and a storage facility 108 selectively and communicatively coupled to one another. The facilities may be communicatively coupled one to another by any suitable communication technologies.

It will be recognized that although facilities 104-108 are shown to be separate facilities in FIG. 1, any of those facilities may be combined into a single facility or split into additional facilities as may serve a particular implementation. Additionally or alternatively, one or more of the facilities 104-108 may be omitted from and external to system 100 in other implementations. Facilities 104-108 will now be described in more detail.

Storage facility 108 may be configured to store media program data 110 representative of media programs that may be distributed by distribution facility 104, media program metadata 112 ("metadata 112") associated with the media programs (e.g., metadata and/or enriched metadata descriptive of the media programs) represented by media program data 110, and user data 114 associated with one or more end users of a media service, such as data representing user profiles of the one or more end users. User profiles may include or be linked to information about comments that the user has provided about media programs, favorites scenes marked by the user, achievements obtained by the user within the media service (e.g., predefined achievements may be unlocked by the user, such as a "film snob" achievement for experiencing a predetermined number and/or different types of movies within the media service, or a channel completion achievement for watching all of the content of a media-on-demand-based "always-on" programming channel), programming channels created by the user, and any other information about the interaction of the user with the media service. Storage facility 108 may maintain additional or alternative data as may serve a particular implementation.

Distribution facility 104 may be configured to facilitate distribution of media programs to users of the media service 102 provided by system 100. Distribution facility 104 may be configured to facilitate distribution of media programs in any way and/or form that is suitable to facilitate access and consumption of the media programs by users of the media service 102.

In certain examples, distribution facility 104 may be configured to distribute media programs by way of multiple different media distribution channels. For example, distribution facility 104 may be configured to distribute media programs by way of a digital media distribution channel and a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs ("BDs"), and/or other physical computer-readable copies of media programs are distributed to users.

Figure 2:
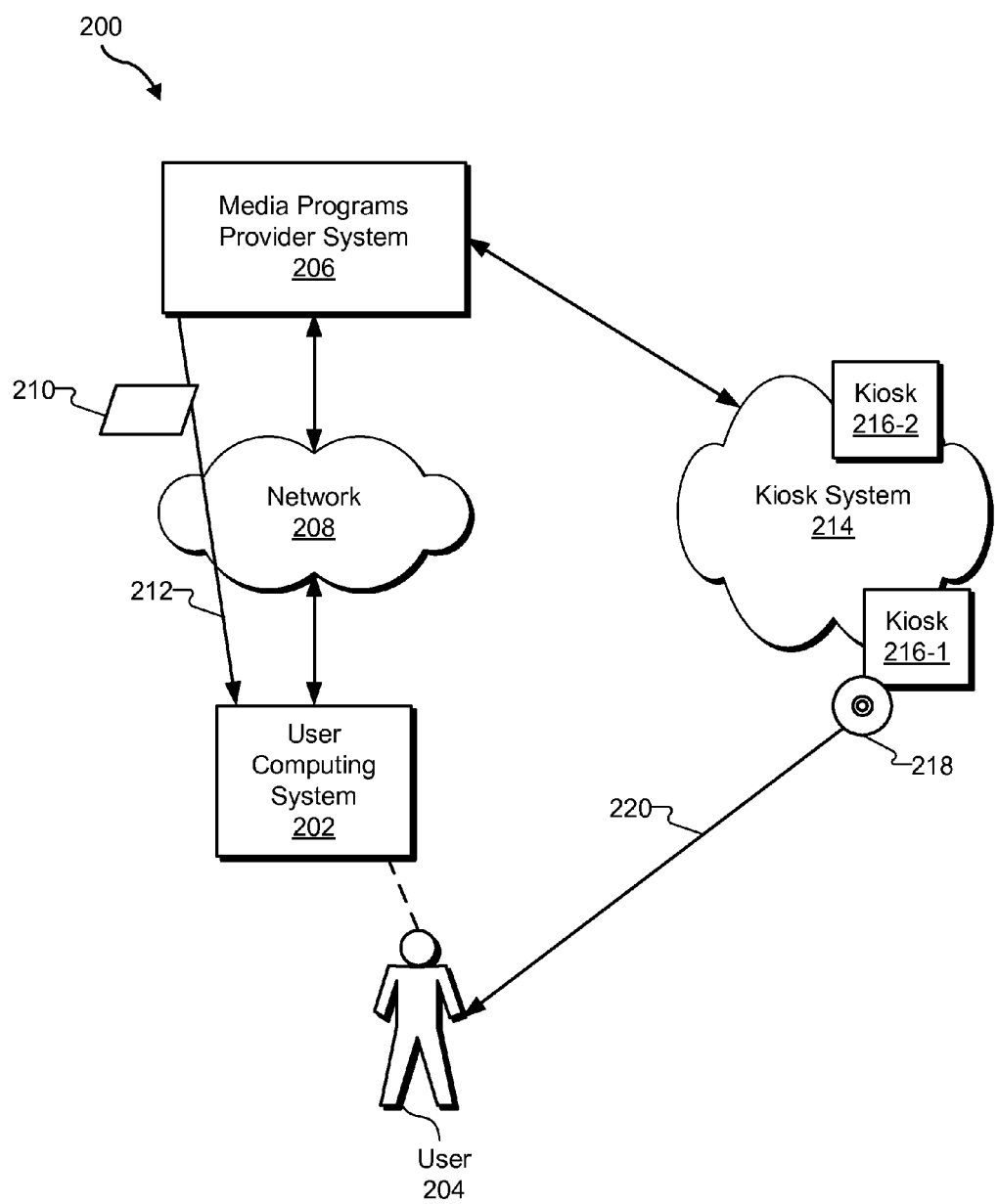
FIG. 2 illustrates an exemplary media distribution configuration in which the system of FIG. 1 may be implemented according to principles described herein.

FIG. 2 illustrates an exemplary media distribution configuration 200. Components of system 100 may be implemented by one or more of the elements of the configuration 200 shown in FIG. 2. As shown, the configuration 200 may include a user computing system 202 associated with a user 204, who may be an end user of the media service 102 provided by system 100. User computing system 202 may be in communication with a media programs provider system 206 ("provider system 206"), which may include one or more computing devices (e.g., server devices remotely located from user computing system 202 and/or operated by a provider of the media service 102).

User computing system 202 and provider system 206 may communicate using any communication platforms and technologies suitable for transporting data (e.g., media programs data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and provider system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and provider system 206. Communications between user computing system 202 and provider system 206 may be transported using any one of the above-listed networks, or any combination or sub-combination of the above-listed networks. Alternatively, user computing system 202 and provider system 206 may communicate in another way such as by direct connections between user computing system 202 and provider system 206.

The configuration 200 may support distribution of media programs, through the media service 102 provided by the system 100, by way of multiple different media distribution channels, such as a digital media distribution channel and a physical media distribution channel. As shown, provider system 206 may distribute media programs such as by distributing digital data 210 representative of a media program to user computing system 202 by way of a digital media distribution channel 212, which may be included as part of or utilized by a digital media distribution model. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, provider system 206 may be in communication with a media vending kiosk system 214, which may include one or more geographically distributed media vending kiosks 216 (e.g., media vending kiosks 216-1 and 216-2) configured to vend physical copies of media programs, such as a physical copy 218 of a media program, to user 204 by way of a physical media distribution channel 220, which may be included as part of or utilized by a physical media distribution model. For example, user 204 may visit a location of media vending kiosk 216-1 and, through the media vending kiosk 216-1, obtain the physical copy 218 of the media program, which may be experienced by the user in a variety of different ways, for example, by inserting the physical copy 218 into a media disc player device such as a DVD or BD player device. In certain examples, one or more of the vending kiosks 216 may include automated media vending machines.

User computing system 202 may be configured for use by user 204 associated with (e.g., operating) the user computing system 202 to access the media service 102 provided by system 100. For example, the user 204 may utilize the user computing system 202 to access one or more user interfaces provided by system 100 as part of and/or for accessing the media service, and to present the user interfaces for use by the user 204 to discover, access, and consume media programs distributed by way of the digital media distribution channel 212 and/or the physical media distribution channel 220 as part of the media service 102.

User computing system 202 may include one or more user computing devices associated with the user 204. Examples of such devices include, without limitation, a media player computing device (e.g., a media disc player device such as a DVD or BD player device), a display device, a set-top box device, a digital video recording ("DVR") device, a computer, a tablet computer, a smart phone device, and any other device capable of accessing the media service and/or media programs provided by system 100 by way of the media service 102.

In certain examples, user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 202 may include any combination of user computing devices or a single user computing device configured to perform any of the user computing system and/or device operations described herein.

Returning to FIG. 1, in certain examples, the distribution facility 104 may be configured to provide users of the media service with access to media programs by way of a plurality of different media distribution models ("distribution models"). Each distribution model may define a particular way that an end user of the media service may gain access to media programs through the media service. Thus, a user of the media service may be able to gain access to media programs by way of multiple different distribution models.

In certain examples, the distribution models may include multiple distribution-channel-based models such as a digital media distribution model that corresponds to or utilizes a digital media distribution channel and a physical media distribution model that corresponds to or utilizes a physical media distribution channel. For example, a digital media program distribution model may include or utilize the digital media distribution channel 212 of FIG. 2, and a physical media distribution model may include or utilize the physical media distribution channel 220 of FIG. 2.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service 102 (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined by a service provider to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 3:
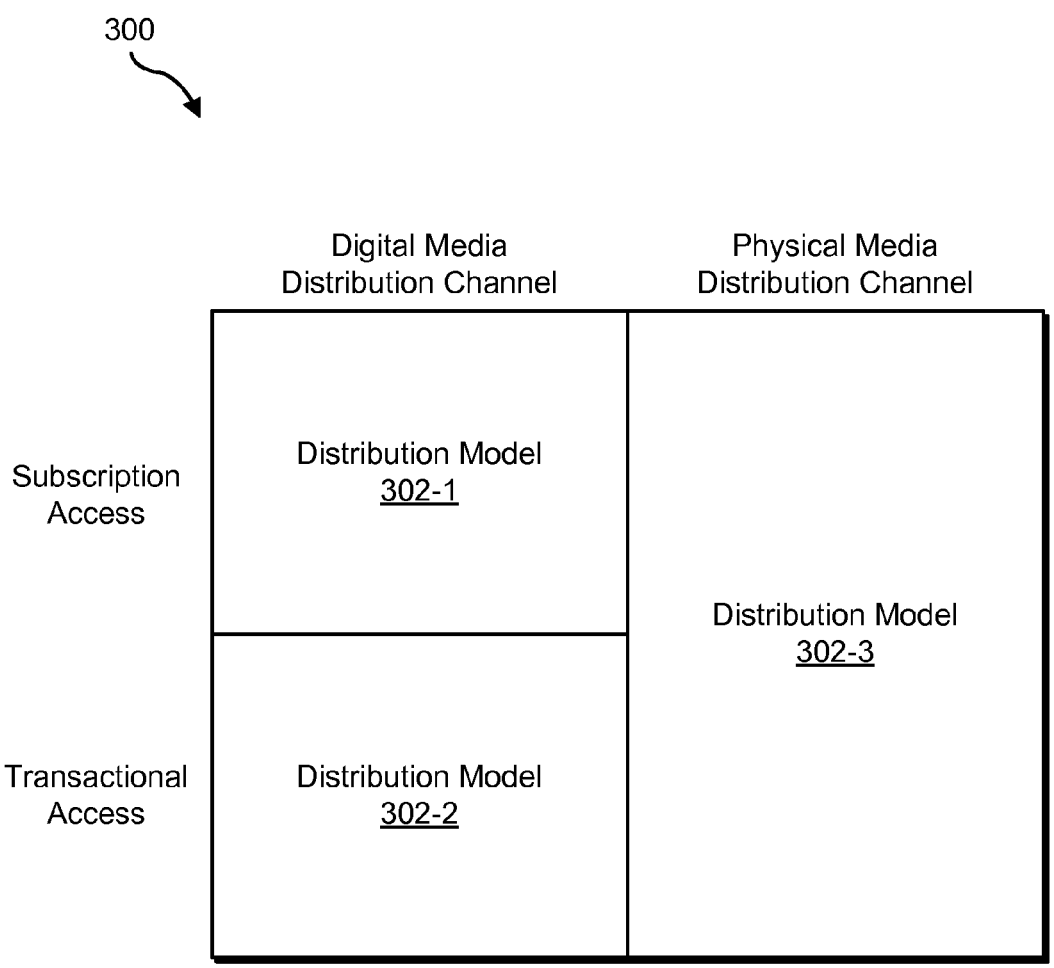
FIG. 3 illustrates a table representing an exemplary set of different media distribution models by way of which access to media programs may be provided by way of a media service according to principles described herein.

Distribution facility 104 may be configured to provide users of the media service 102 with access to media programs by way of any of the different distribution models described herein, or by way of any combination or subcombination thereof. As an example, FIG. 3 illustrates a table 300 representing a set of different distribution models by way of which access to media programs may be provided through the media service 102 in certain implementations. As shown, the set of distribution models includes a first distribution model 302-1 associated with subscription-based access to media programs by way of a digital media distribution channel, a second distribution model 302-2 associated with transactional-based access to media programs by way of the digital media distribution channel, and a third distribution model 302-3 associated with either or both subscription-based or transactional-based access to media programs by way of a physical media distribution channel. In certain examples, these distribution models may be referred to as a "subscription" digital distribution model, an "on-demand" or "rent/buy" digital distribution model, and a "physical" or "kiosk" distribution model.

Media programs distributed by distribution facility 104 as part of media service 102 may be assigned to one or more of the distribution models provided by distribution facility 104. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 302-3 only. At the end of that period of time, the media program may leave distribution model 302-3, meaning that the media program is no longer accessible by way of distribution model 302-3. For a second period of time, however, the same media program may be distributed by way of distribution model 302-2 only. For example, when the media program leaves distribution model 302-3, the media program may be added to distribution model 302-2. At the end of the second period of time, the same media program may leave distribution model 302-2 and be assigned to distribution model 302-1. This example is illustrative only, a media program may be made accessible by way of different distribution models or specific combinations of distribution models for specific periods of time, and may be added to or removed from any distribution model in any suitable way.

Distribution facility 104 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

System 100 may be configured to provide one or more tools to facilitate user discovery of media programs distributed by distribution facility 104 through the media service 102. The discovery may include discovery of information about media programs, including information representative of distribution models by way of which the media programs are accessible through media service 102 and/or other information about the media programs that is specific to one or more of the distribution models. To this end, system 100 may maintain and/or access data representative of information about media programs distributed by distribution facility 104.

Returning to FIG. 1, management facility 106 may be configured to perform various media program management operations. For example, management facility 106 may provide one or more planning features for use by a user of the media service to plan for future discovery and/or consumption of media programs, such as for consumption of media programs during a future media consumption session. In particular, management facility 106 may provide one or more tools for use by a user (e.g., user 204) to specify one or more planning parameters (or simply "parameters") associated with the future media consumption session. To illustrate, management facility 106 may provide one or more tools that allow the user to specify a time period associated with the future media consumption session, an audience that will consume one or more media programs during the future media consumption session, a mood associated with the future media consumption session, an event associated with the future media consumption session, a type of media programs (e.g., media programs available within one or more vending kiosks associated with the user, on-demand media programs included in the user's subscription to the media service, etc.) that the user plans to consume during the future media consumption session, etc. Each of these planning parameters will be described in more detail below.

To facilitate user planning of a future media consumption session, management facility 106 may provide, for display, one or more user interfaces through which users may access and interface with a media service (e.g., media service 102) to discover, access, consume, and/or plan to consume media programs. The one or more user interfaces may be provided in any suitable form. For example, management facility 106 may be configured to provide a website, a client application user interface (e.g., a user interface provided by a client application such as a "mobile app" installed and running on user computing system 202), a media player user interface, a graphical user interface ("GUI"), and/or any other form of user interface configured to facilitate user interaction with the media service. Management facility 106 may be configured to provide any of the exemplary user interfaces illustrated herein, including one or more user interface views that allow a user to specify one or more planning parameters associated with a future media consumption session.

Figure 4:
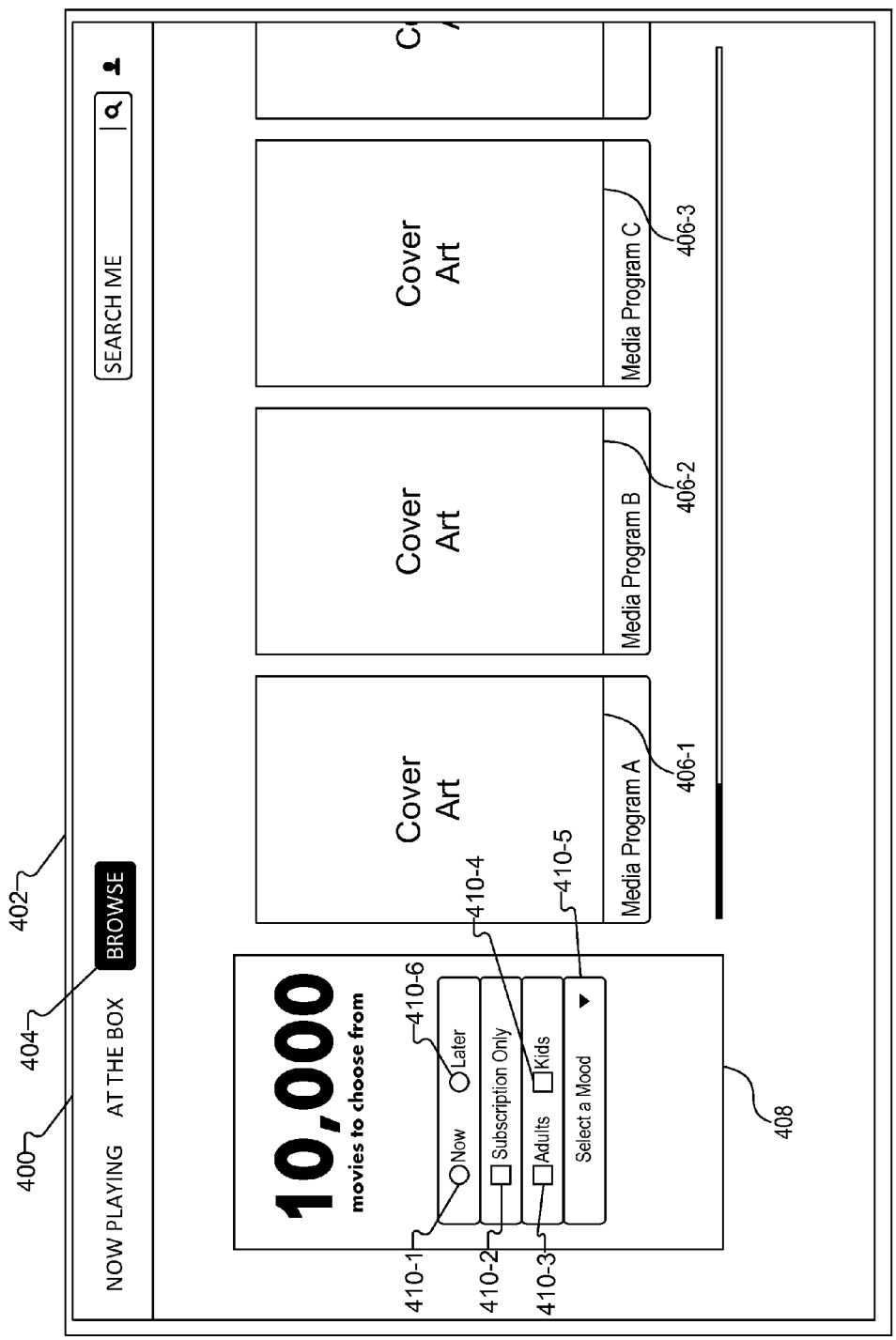
FIGS. 4-9 illustrate exemplary user interface views according to principles described herein.

To illustrate, FIG. 4 depicts a browse view 400 of a user interface that may be provided by management facility 106. The browse view 400 may be provided for display on a display screen 402 associated with a user (e.g., on a display screen associated with user computing system 202). In certain examples, management facility 106 may provide the browse view 400 for display in response to a user request to browse through media programs accessible via the media service. Such a user request may be made through a user selection of a "browse" option 404 illustrated in FIG. 4. By selecting "browse" option 404, the user may initiate a first media consumption session during which the user may browse media programs accessible via the media service.

As used herein, a "first media consumption session" may refer to a current media consumption session during which the user may consume media programs available for consumption during the current access session. For example, the first media consumption session may commence when the user accesses browse view 400 and/or any other interface view associated with the media service (e.g., by logging in to the media service, opening a client application associated with the media service, etc.) and may end when the user stops accessing any of the interface views associated with the media service (e.g., by logging out of the media service, closing a client application associated with the media service, etc.). In contrast, a "second media consumption session" may refer to a future media consumption session that is subsequent to the first media consumption session. For example, the second media consumption session may commence after the first media consumption ends (e.g., the second media consumption session may commence when the user logs in again to the media service after having logged out of the media service, opens the client application associated with the media service after having closed the client application, etc.). In some examples, the second media consumption session may refer to a particular time period subsequent to the first media consumption session (e.g., a particular day that follows a day during which the first media consumption session occurs).

The browse view 400 may be configured to display listing information associated with a plurality of media programs provided by the media service. For example, FIG. 4 shows that browse view 400 may include a plurality of cover art image objects 406 (e.g., cover art image objects 406-1 through 406-3) that each represent a different media program provided by the media service. For example, cover art image object 406-1 represents a media program titled "Media Program A," cover art image object 406-2 represents a media program titled "Media Program B," and cover art image object 406-3 represents a media program titled "Media Program C."

As used herein, the term "cover art image object" may refer to any image or icon that represents a media program. Such an image or icon may include a thumbnail image of a cover of a physical copy of a media program, an image from a particular scene included in the media program, and/or any other image or icon that may be used to represent the media program. The cover art image objects 406 may be arranged within browse view 400 in any suitable manner. In the illustrated example, a single row of similarly-sized cover art image objects 406 is provided. However, in some examples, at least some cover art image objects may be larger in size than others and/or may be alternatively arranged (e.g., in a grid).

The media programs represented in the browse view 400 may be available by way of multiple different media distribution models through the media service provided by system 100. The multiple different distribution models may include any one (or combination) of the media distribution models described above. For example, the media programs may be available to rent or buy in a standard definition ("SD") format or a high definition ("HD") format by way of the digital channel-based distribution model, and may be available in DVD format or BD format for rental or purchase from one or more media vending kiosks by way of the physical channel-based distribution model.

In some examples, the media programs initially represented in the browse view 400 may be available for consumption during the first media consumption session. In other words, system 100 may initially prevent listing information associated with media programs that are not available for consumption during the first media consumption session from being displayed within browse view 400. To illustrate, if a physical copy of a movie is not currently available at any media vending kiosk associated with the user (e.g., at any media vending kiosk within a predetermined distance from the user and/or at any media vending kiosk predefined by the user as a favorite of or otherwise associated with the user) while the user accesses the browse view 400, system 100 may prevent listing information associated with the movie from being displayed within browse view 400.

The browse view 400 may include content configured to facilitate convenient and/or intuitive planning for future consumption of media programs and/or assessment of the different media programs accessible via the media service. For example, as shown in FIG. 4, management facility 106 may provide, for display within browse view 400, a planning section 408 that includes a plurality of user-selectable planning options 410 (e.g., planning options 410-1 through 410-6). In the illustrated example, planning section 408 is displayed to the left of cover art image object 406-1. However, it will be recognized that planning section 408 may be alternatively displayed in any suitable manner. In some alternative examples, planning section 408 may be displayed on a second display screen while browse view 400 is displayed on display screen 402.

One or more of planning options 410-1 through 410-6 may be selected by the user to filter or narrow down the media programs represented in browse view 400. For example, as illustrated in FIG. 4, planning section 408 may include a "Now" planning option 410-1. In response to a user selection of "Now" planning option 410-1, management facility 106 may filter the listing information (e.g., cover art image objects 406) provided for display in browse view 400 to include only listing information associated with media programs that are available by way of the media service during the first media consumption session (i.e., the current media consumption session).

As further illustrated in FIG. 4, planning section 408 may include a "Subscription Only" planning option 410-2. In response to a user selection of the "Subscription Only" planning option 410-2, management facility 106 may filter the listing information provided for display in browse view 400 to include only listing information associated with media programs that are available through a subscription of the user to the media service.

As further illustrated in FIG. 4, planning section 408 may include an "Adults" planning option 410-3. In response to a user selection of the "Adults" planning option 410-3, management facility 106 may filter the listing information provided for display in browse view 400 to include only listing information associated with media programs that have been tagged as only being suitable for adults.

As further illustrated in FIG. 4, planning section 408 may include a "Kids" planning option 410-4. In response to a user selection of the "Kids" planning option 410-4, management facility 106 may filter the listing information provided for display in browse view 400 to include only listing information associated with media programs tagged as being directed towards children.

As further illustrated in FIG. 4, planning section 408 may include a "Select a Mood" planning option 410-5. In the example shown in FIG. 4, the "Select a Mood" planning option 410-5 includes a drop-down menu that may be configured to present one or more mood options to the user. With the "Select a Mood" planning option 410-5, the user may select a particular mood (e.g., "dark," "light," "happy," "sad," "festive," etc.) that the user is in. Based on the selected mood, management facility 106 may filter the listing information provided for display in browse view 400 to include only listing information associated with media programs that have been tagged as being related to the selected mood.

As further illustrated in FIG. 4, planning section 408 may include a "Later" planning option 410-6. The "Later" planning option 410-6 may be selected by the user to indicate that the user plans to consume at least one media program provided by the media service during a second media consumption session that is subsequent to the first media consumption session (i.e., during a future media consumption session).

In response to a user selection of the "later" planning option 410-6, management facility 106 may present a user interface that allows the user to specify one or more parameters associated with the second media consumption session. The user interface may be presented in any suitable manner. For example, the user interface may be displayed within browse view 400. Alternatively, the user interface may be displayed in place of browse view 400 on display screen 402 or provided for display on a second display screen while browse view 400 is displayed on display screen 402.

Figure 5:
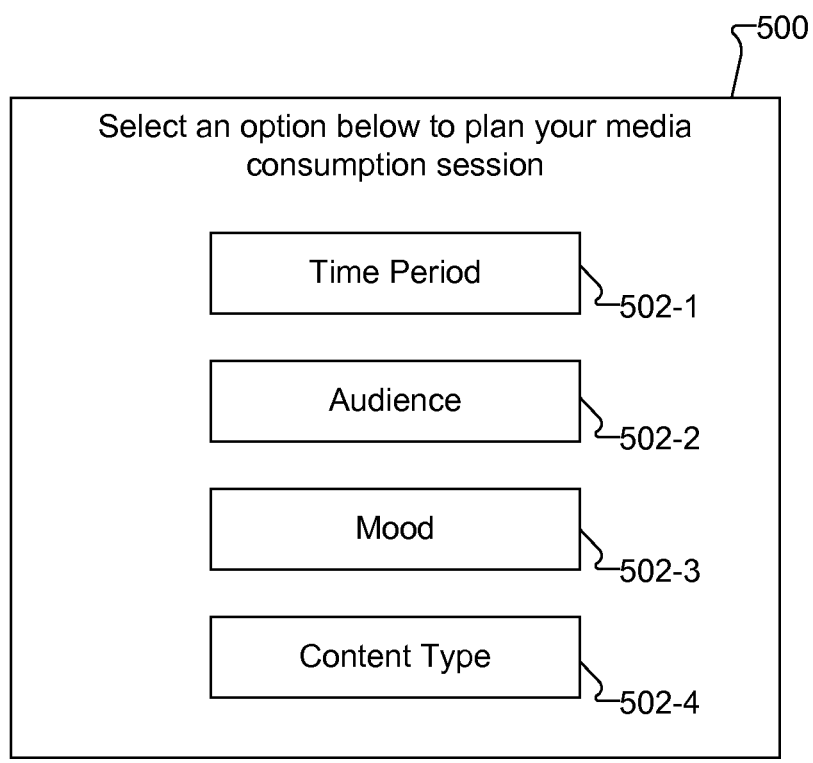

FIG. 5 shows an exemplary user interface 500 that may be presented by management facility 106 in response to a selection by the user of the "later" planning option 410-6 and that may be used by the user to specify one or more parameters associated with the second media consumption session. As shown, user interface 500 includes a plurality of options 502 (e.g., options 502-1 through 502-4) that may be selected by the user in order to specify various parameters associated with the second media consumption session.

As shown, the user may select option 502-1 to specify a time period associated with the second media consumption session. For example, the user may specify a particular day that he or she intends to consume at least one media program (e.g., by selecting a particular day from a calendar view that is displayed in response to the user selection of option 502-1). As another example, the user may specify a block of time (e.g., a group of days, such as a weekend, if the user is flexible about when he or she may consume the at least one media program). As another example, the user may specify a particular time (e.g., later in the same day) that the user would like to consume at least one media program.

User input representative of the specified time period may be provided by way of user interface 500 in any suitable manner. For example, in response to a user selection of option 502-1, one or more additional user interface views may be provided for display within user interface 500 that facilitate entry by the user of the specified time period. Likewise, user input of any of the other specified parameters described herein may be provided by way of user interface 500 in any suitable manner.

The user may additionally or alternatively select option 502-2 to specify an audience that will consume at least one media program during the second media consumption session. For example, the user may specify a group of one or more people (e.g., one or more friends, family members, and/or social media contacts of the user) that plan to participate in the second media consumption session. It will be recognized that the audience may include or exclude the user.

The user may additionally or alternatively select option 502-3 to specify a mood associated with the second media consumption session. For example, the user may plan to celebrate a birthday during the second media consumption session and may therefore specify a "happy" mood as being associated with the second media consumption session.

The user may additionally or alternatively select option 502-4 to specify a content type associated with the second media consumption session. As used herein, a "content type" refers to any media program attribute that may be specified by the user. For example, the content type may include a genre, a format, a resolution, and/or any other media program attribute as may serve a particular implementation.

Additional or alternative parameters associated with the second media consumption session may be specified by way of user interface 500 and/or any other user interface as may serve a particular implementation. For example, the user may utilize user interface 500 and/or any other user interface to specify an event (e.g., a party, a plane ride, a teaching lesson, a holiday, etc.) that may be associated with the second media consumption session. The user may additionally or alternatively specify where the user intends to consume the at least one media program during the second media consumption session. For example, the user may specify that the user intends to consume the at least one media program within his or her home and/or that the user does not intend to leave his or her home before the second media consumption session is to begin.

In some examples, management facility 106 may allow the user to indicate different weights (e.g., levels of importance) for the planning parameters. For example, management facility 106 may allow the user to indicate that a specified time period is relatively more important than a specified audience. Management facility 106 may use the specified weights to identify media programs that comply with the specified parameters.

Management facility 106 may be further configured to identify, based on the one or more parameters specified by the user, one or more media programs that are available for consumption by the user during the second media consumption session. This may be performed in any suitable manner. For example, management facility 106 may identify one or more media programs that comply with the one or more parameters specified by the user and that are available for consumption by the user during the second media consumption session.

To illustrate, the user may specify a time period associated with the second media consumption session, as described above. In response, management facility 106 may identify one or more media programs that are available for consumption during the specified time period. For example, management facility 106 may identify media programs that are available for vending by way of a media vending kiosk associated with the user during the specified time period and/or on-demand programs that are available for on-demand access during the specified time period. One or more of these media programs may, in some cases, not be available for consumption during the first media consumption session. For example, a particular media program may be checked out of a media vending kiosk during the first media consumption session and/or not yet released for on-demand access during the first media consumption session.

Additionally or alternatively, the user may specify an audience that will consume at least one media program during the second media consumption session, as described above. In response, management facility 106 may identify one or more media programs that are available for consumption during the second media consumption session and that are identified as potentially being of interest to the audience (i.e., to each person included in the audience). To this end, management facility 106 may access user profiles associated with one or more of the users in order to determine one or more preferences of each user.

To illustrate, the user may invite a friend to the user's home to watch a movie together. The user may desire to impress the friend by selecting a movie likely of interest to the user. To that end, the user may utilize user interface 500 to identify the friend as being included in an audience associated with the second media consumption session. In response, management facility 106 may access a user profile associated with the friend and use the user profile to identify one or more media programs that are likely of interest to the friend.

Additionally or alternatively, the user may specify a mood associated with the second media consumption session, as described above. In response, management facility 106 may identify one or more media programs that are available for consumption during the second media consumption session and that are associated with the specified mood.

Additionally or alternatively, the user may specify a content type associated with the second media consumption session, as described above. In response, management facility 106 may identify one or more media programs that are available for consumption during the second media consumption session and that are associated with the specified content type.

Management facility 106 may identify one or more media programs based on any other parameter specified by the user as may serve a particular implementation. For example, the user may specify a particular holiday as being associated with the second media consumption session. In response, management facility 106 may identify one or more media programs that are available for consumption during the second media consumption session and that are associated with the holiday.

Management facility 106 may be further configured to present, within the browse view during the first media consumption session, listing information associated with the one or more media programs identified as being available for consumption during the second media consumption session and as complying with the one or more user specified parameters associated with the second media consumption session. This may be performed in any suitable manner.

For example, as illustrated in FIG. 4, browse view 400 may initially include listing information (e.g., cover art image objects 406) associated with media programs available for consumption during the first media consumption session. In response to the user specifying one or more planning parameters associated with a second media consumption session that is subsequent to the first media consumption session, management facility 106 may update (e.g., filter) the listing information displayed in browse view 400 to include listing information associated with media programs that comply with the one or more planning parameters and that are available for consumption during the second media consumption session.

Figure 6:
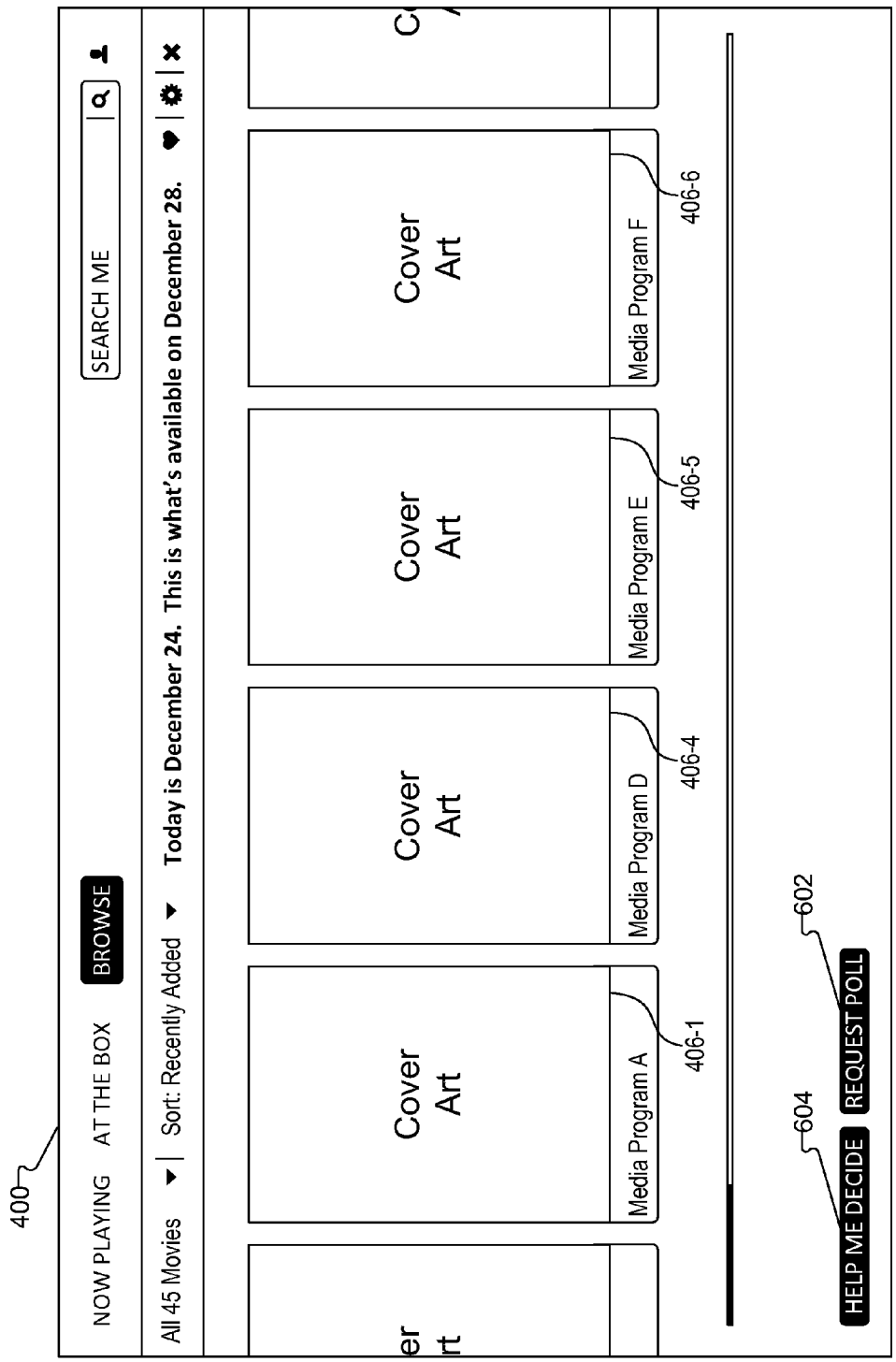

To illustrate, the first media consumption session may be initiated on December 24. The user may, however, desire to view listing information for media programs available for consumption on December 28. The user may accordingly specify December 28 as being associated with the second media consumption session. FIG. 6 shows browse view 400 after the user has specified December 28 as being associated with the second media consumption session. As shown, the listing information displayed in browse view 400 has been updated to include cover art image objects 406 representative of media programs available for consumption on December 28. In particular, the listing information displayed in browse view 400 has been updated to include cover art image objects 406-4 through 406-6, representative of media programs entitled "Media Program D" through "Media Program F", respectively, even though these media programs may not be available for consumption on December 24.

In some examples, in response to the user specifying one or more parameters associated with the second media consumption session, management facility 106 may prevent listing information associated with any media program that is not available for consumption during the second media consumption session from being presented within the browse view 400 during the first media consumption session. For example, the media program titled "Media Program B" may not be available for consumption on December 28. Hence, cover art image object 406-2 is prevented from being displayed in browse view 400, as shown in FIG. 6.

Management facility 106 may also prevent any media program that is available for consumption by the user during the second media consumption session but that does not comply with the one or more parameters specified by the user from being presented within the browse view 400 during the first media consumption session. For example, the media program titled "Media Program C" may be available for consumption on December 28, but may not comply with one or more other parameters specified by the user. Hence, cover art image object 406-3 may be prevented from being displayed in browse view 400, as shown in FIG. 6.

The user may reserve any of the media programs represented by cover art image objects 406 shown in FIG. 6 for consumption during the second media consumption session in any suitable manner. For example, the user may reserve the media program titled "Media Program D" for consumption during the second media consumption session by selecting the cover art image object 406-4 representative of the media program.

Figure 7:
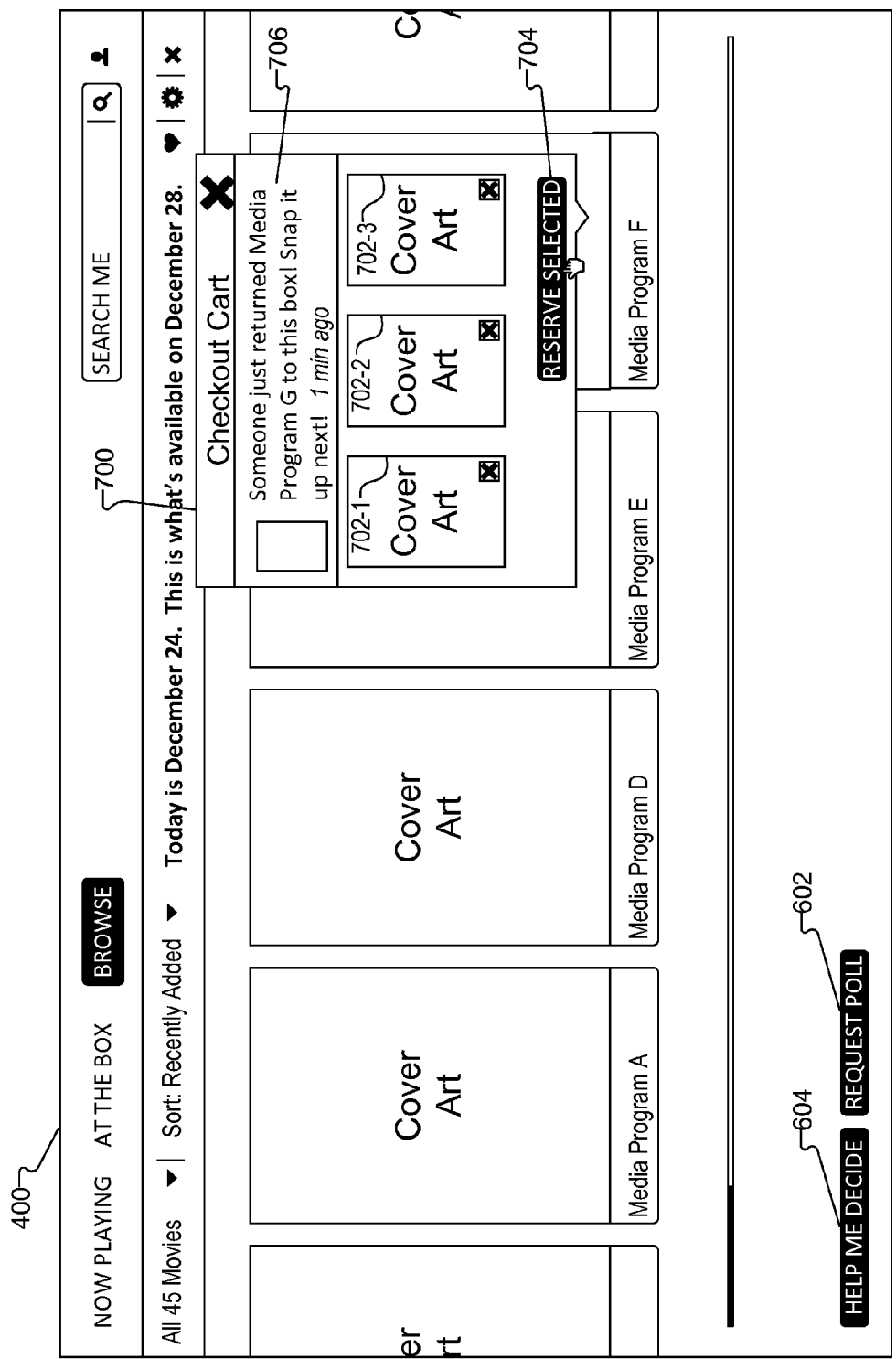

In response to a user selection of a media program, management facility 106 may add the media program to a checkout cart associated with the user. FIG. 7 illustrates an exemplary checkout cart 700 that may be presented to the user within browse view 400. As shown, the checkout cart 700 may be in the form of a pop-up window. Checkout cart 700 may be alternatively presented in any other way.

As shown, checkout cart 700 may be populated with cover art image objects 702 (e.g., cover art image objects 702-1 through 702-3) representative of media programs that have been added to the checkout cart 700. To reserve one or more media programs included in the checkout cart 700 (i.e., reserve them for consumption during the second media consumption session), the user may select the one or more media programs and then select a "reserve selected" option 704.

In some examples, media programs may be added to checkout cart 700 manually by the user (e.g., in response to the user manually selecting the media programs from browse view 500). Additionally or alternatively, management facility 106 may automatically add media programs to the checkout cart 700. For example, management facility 106 may automatically add one or more media programs identified as being potentially of interest to the user based on one or more planning parameters associated with the second media consumption session as specified by the user.

To illustrate, the user may desire to reserve a group of media programs for consumption during an upcoming plane ride. To this end, the user may specify the duration of the plane ride and/or one or more other parameters associated with the plane ride. In response, management facility 106 may automatically add one or more media programs to the checkout cart 700 that are potentially of interest to the user (e.g., based on a user profile of the user) and that could be consumed by the user during the duration of the plane ride.

In some examples, a particular media program that complies with the one or more preferences associated with the second media consumption session as specified by the user may not be available for consumption during the second media consumption session. However, after some time (e.g., at some point in time between the first and second media consumption sessions), the media program may become available for consumption during the second media consumption session. Management facility 106 may track the availability of the media program and provide a notification to the user when the media program becomes available for consumption during the second media consumption session.

To illustrate, a physical copy of a media program that complies with the one or more preferences specified by the user may not be initially available for vending at one or more media vending kiosks associated with the user. Management facility 106 may subsequently detect that the physical copy of the media program becomes available for vending at a particular media vending kiosk associated with the user. In response, management facility 106 may provide a notification to the user of the availability.

Management facility 106 may provide the notification to the user in any suitable manner. For example, management facility 106 may provide a text message, an email, and/or any other type of alert representative of the notification to the user.

In some examples, management facility 106 may notify the user of an availability of a media program by dynamically updating the checkout cart 700 with the media program as it becomes available. Management facility 106 may also provide a text-based notification (e.g., notification 706) within the checkout cart 700 as the media program becomes available.

In certain examples, management facility 106 may provide a notification when a predetermined threshold number of the media programs in checkout cart 700 has been reached. The predetermined threshold number may be determined in any suitable manner. In some examples, the predetermined threshold number may be based on a past user consumption history of media programs. For example, management facility 106 may determine that the user typically rents two media programs during a given media consumption session. Accordingly, management facility 106 may set the predetermined threshold number at two and may provide the notification, in any suitable manner, when two media programs are in checkout cart 700.

In some examples, management facility 106 may provide one or more tools that facilitate the user tagging a media program. The tag may indicate any information about the media program and/or the interest of the user in the media program. For example, a tag may include a keyword of "weekend" to indicate that the user prefers to experience the media program on a weekend. Management facility 106 may be configured to use such tags for future identification of media programs that comply with planning preferences specified by the user.

In certain examples, management facility 106 may be configured to provide one or more media service features to help a user of the media service decide what media program to choose to consume. For example, a user may select a "request poll" option 602 in order to poll one or more other users with respect to one or more media programs.

Figure 8:
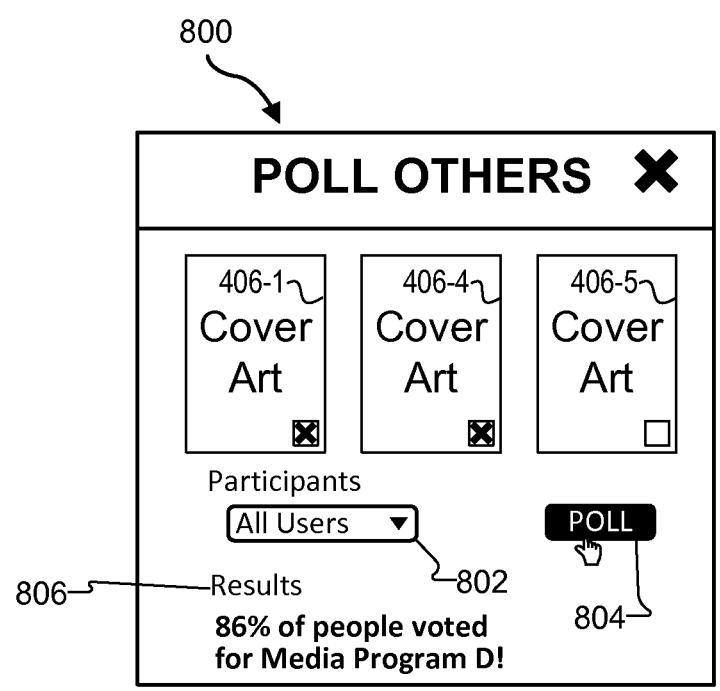

FIG. 8 illustrates an exemplary polling interface 800 that may be presented (e.g., within browse view 400 or within a second display screen) in response to a user selection of the "request poll" option 602.

As illustrated in FIG. 8, polling interface 800 may include two or more of the cover art image objects 406 (e.g., cover art image objects 406-1, 406-4, and 406-5). The user may select which media programs on which to base the poll by entering, in any suitable manner, an "x" on the cover art image objects 406. In the illustrated example, the "x"s indicate that the poll will be between the media programs represented by cover art image objects 406-1 and 406-4.

As further illustrated in FIG. 8, polling interface 800 may include a "participants" option 802 through which the user may specify the participants for the poll by way of a drop down menu. In the illustrated example, all users of the media service are specified to help the user decide between the media programs represented by cover art image objects 406-1 and 406-4. Any other group of one or more users may alternatively be selected for inclusion in the poll as may serve a particular implementation.

As further illustrated in FIG. 8, polling interface 800 may include a "Poll" option 804 and a "Results" section 806. The "Poll" option 804 may be selected by the user to initiate the poll (e.g., forward the poll to the participants). "Results" section 806 includes a report of the results of the poll. In the illustrated example, "Results" section 806 indicates that "86% of people voted for Media Program D!" Based on the results provided in "Results" section 806, the user may decide to consume the media program titled "Media Program D" during the second media consumption session.

Returning to FIG. 6, the user may additionally or alternatively select a "help me decide" option 604 in order to request help in deciding whether to consume a particular media program or in deciding between two or more media programs.

Figure 9:
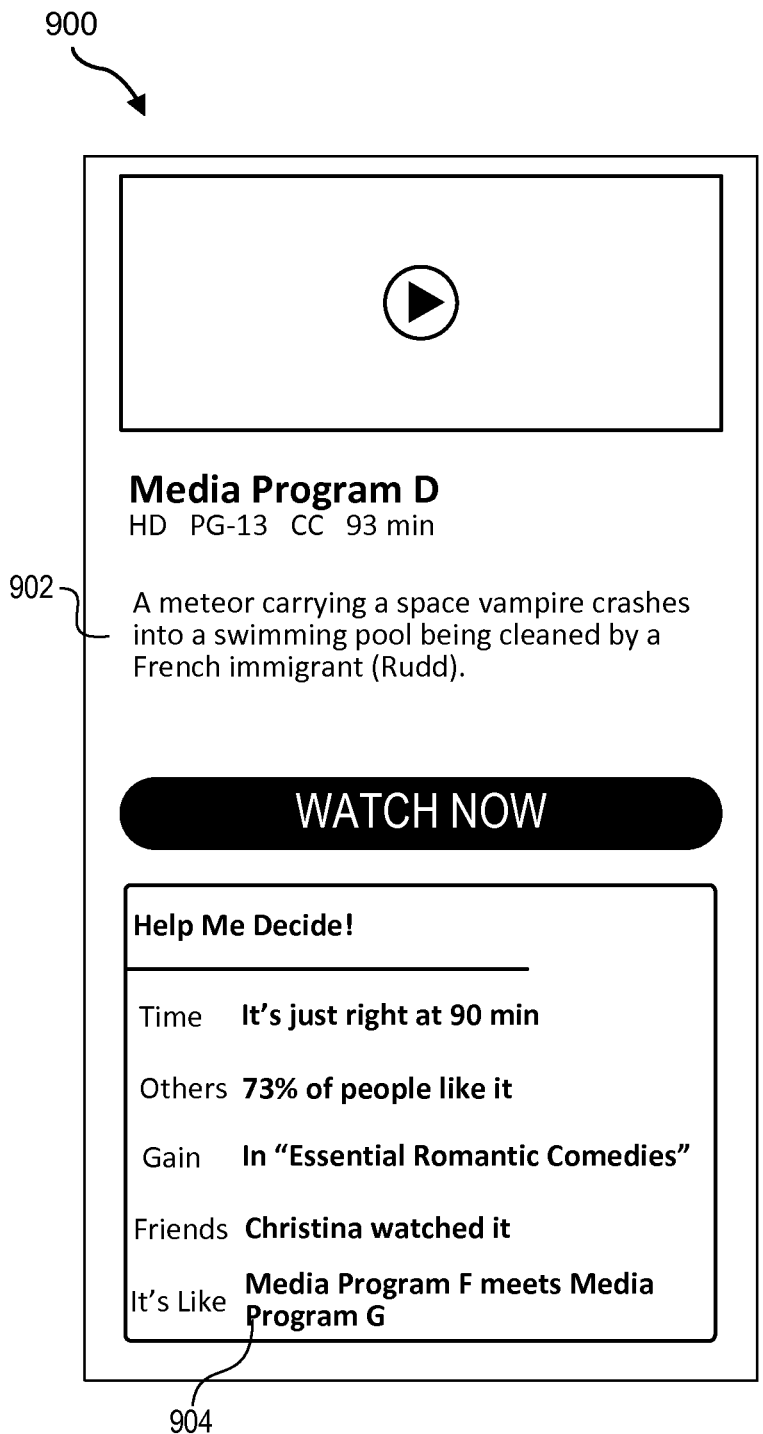

FIG. 9 illustrates an exemplary selection interface 900 that may be presented (e.g., within browse view 400 or within a second display screen) in response to a user selection of the "help me decide" option 604. As shown, selection interface 900 may include a synopsis 902 of a particular media program as specified by the user, which in this case is the media program titled "Media Program D". Selection interface 900 may also include comparison information 904 that compares the media program with one or more other media programs. The user may utilize synopsis 902 and comparison information 904 to determine whether he or she is interested in the media program.

Selection interface 900 may include additional or alternative information that may help the user determine whether he or she is interested in the media program. For example, selection interface 900 may include content that indicates degrees of relatedness of one or more media programs to a particular media program or one or more elements of the media program. For example, graphical objects representative of related media programs may be presented in a way that visually indicates different degrees of relatedness to the media program or one or more elements of the media program. The visually represented degrees of closeness may help a user of the media service to understand how well the media program is related to an attribute of another media program. For example, the selection interface 900 may visually illustrate multiple different degrees of closeness to an actor and may visually indicate one or more media programs that are related to the actor, as well as the degrees of closeness by which the media programs are related to the actor.

In certain examples, management facility 106 may be configured to generate a bottom line score of a media program with respect to a user of the media service. In some examples, the user may be able to specify the bottom line score through a user preference interface. For example, each media program may be associated with a rating from zero to one hundred. Through the user preference interface, the user may specify a bottom line score of eighty. In view of the preference set by the user, management facility 106 may be configured to recommend only media programs having bottom-line scores that satisfy a predetermined minimum threshold (e.g., media programs with ratings that are equal to or higher than eighty) to the user. In this regard, the bottom line score may be configured to function as a condition for recommending media programs to the user. In another example, management facility 106 may determine the bottom line score for the user. In such an example, management facility 106 may be configured to determine a bottom line score for a media program with respect to the user in any suitable manner, including by using a combination of general information about the media program across the users of the media service and/or information about the media program as it specifically relates to the user. Such information may include ratings that may be determined based on any one or a combination of user ratings, community ratings, critic ratings, etc.

Management facility 106 may be configured to use a bottom line score of a media program in combination with one or more other criteria to determine media programs to recommend to the user. As an example, management facility 106 may be configured to recommend relatively older media programs as part of a promotion or to fulfill a request such as a filter or search request provided by the user. Additionally or alternatively, the bottom line score may be based at least in part on general ratings or statistics associated with the media program across the media service. This may allow management facility 106 to consider only more popular or more highly rated media programs when determining what media programs to recommend to the user.

Figure 10:
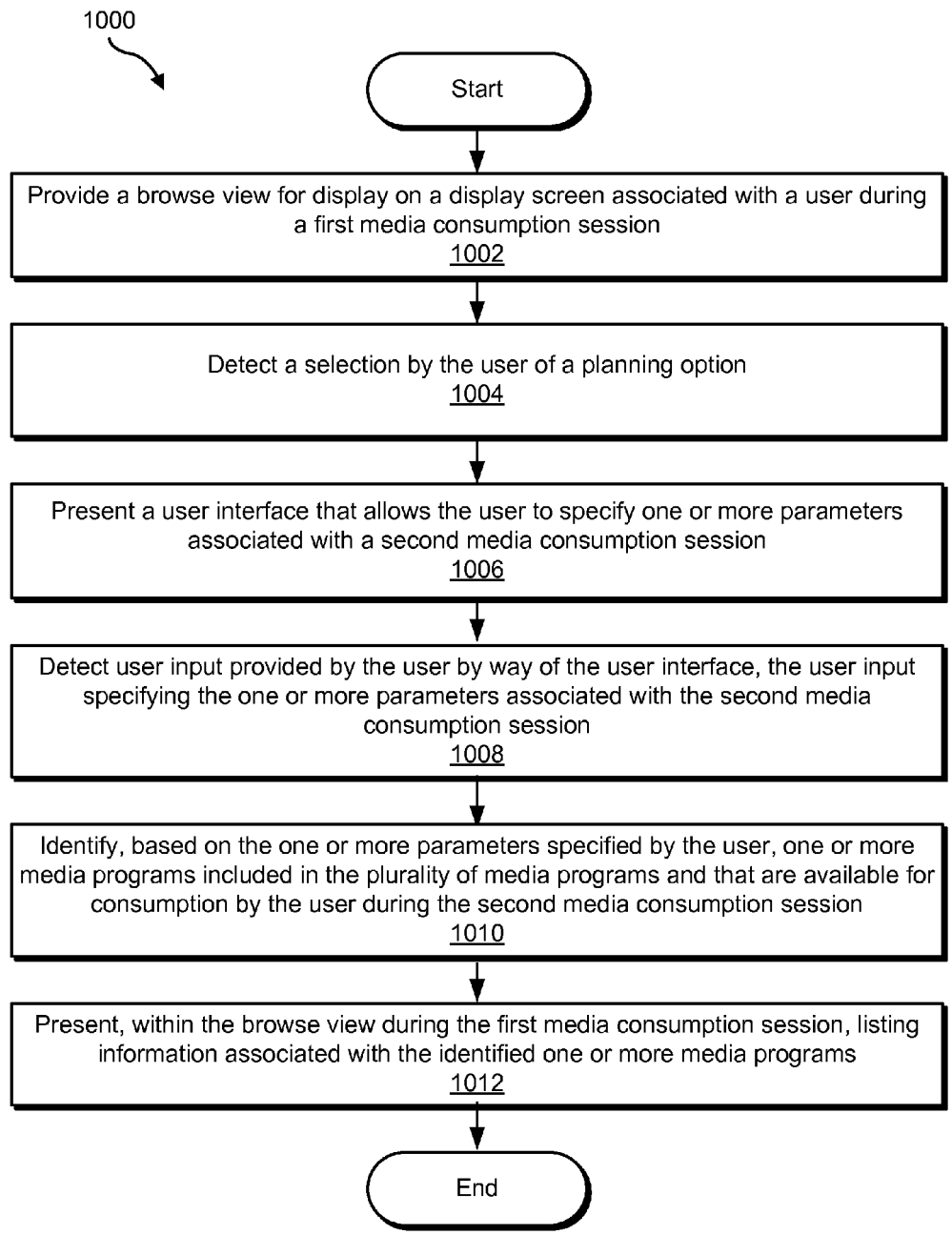
FIG. 10-11 illustrate exemplary methods for facilitating planning of a future media consumption session by a user of a media program distribution service according to principles described herein.
Figure 11:
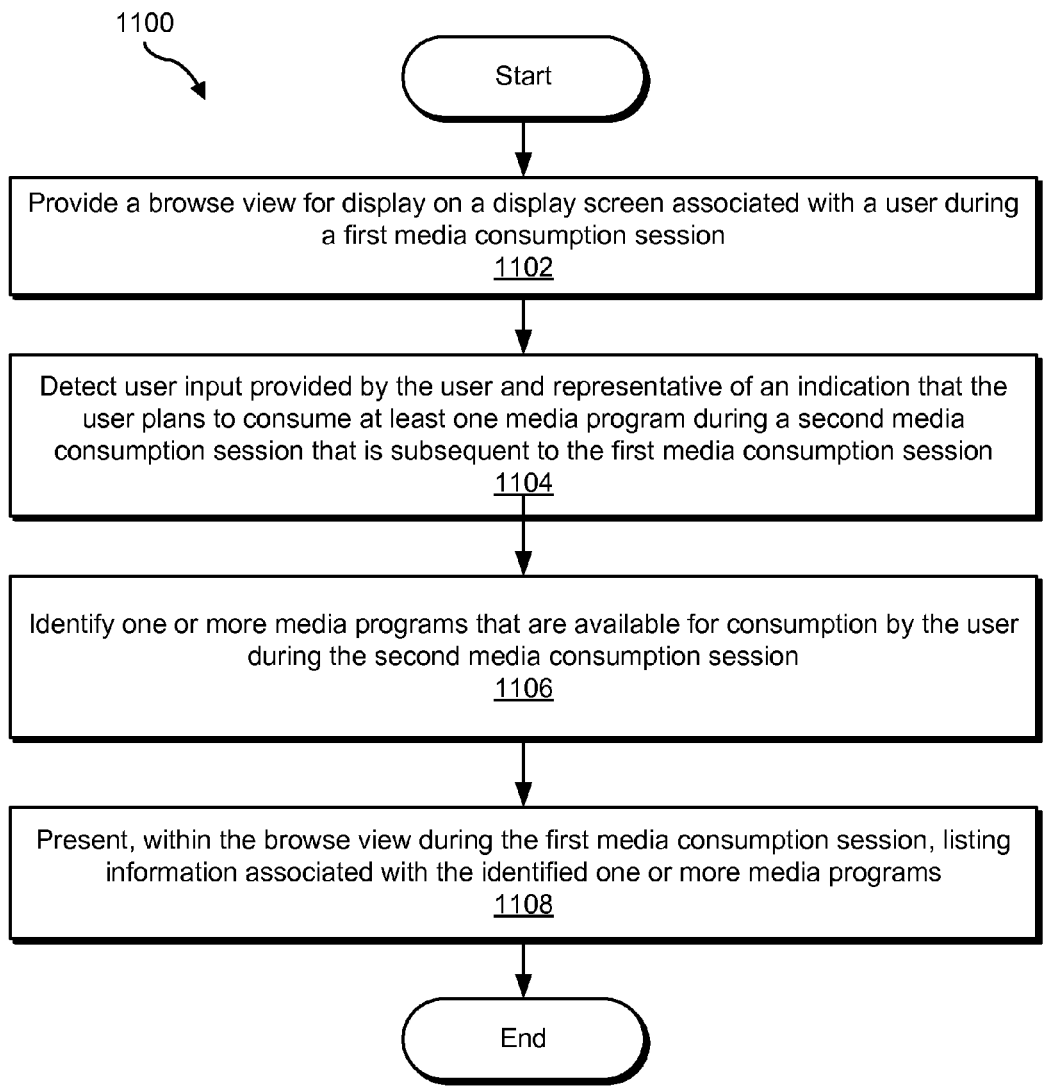

FIGS. 10-11 illustrate exemplary methods 1000-1100 for facilitating planning of a future media consumption session by a user of a media program distribution service according to principles described herein. While FIGS. 10-11 illustrate exemplary steps according to certain embodiments, other embodiments may omit, add to, reorder, combine, and/or modify any of the steps shown in FIGS. 10-11. In certain embodiments, one or more of the steps shown in FIGS. 10-11 may be performed by system 100 and/or one or more components or implementations of system 100.

Turning to method 1000 illustrated in FIG. 10, in step 1002, a media service provider system provides a browse view for display on a display screen associated with a user during a first media consumption session. In some examples, the browse view may be configured to display listing information associated with a plurality of media programs provided by a media program distribution service. Step 1002 may be performed in any of the ways described herein.

In step 1004, the media service provider system detects a selection by the user of a planning option. As described above, the selection of the planning option may indicate that the user plans to consume at least one media program included a the plurality of media programs during a second media consumption session that is subsequent to the first media consumption session. Step 1004 may be performed in any of the ways described herein.

In step 1006, the media service provider system presents a user interface that allows the user to specify one or more parameters associated with the second media consumption session. Step 1006 may be performed in any of the ways described herein.

In step 1008, the media service provider system detects user input provided by the user by way of the user interface. As described above, the user input may specify the one or more parameters associated with the second media consumption session. Step 1008 may be performed in any of the ways described herein.

In step 1010, the media service provider system identifies, based on the one or more parameters specified by the user, one or more media programs included in the plurality of media programs and that are available for consumption by the user during the second media consumption session. Step 1010 may be performed in any of the ways described herein.

In step 1012, the media service provider system presents, within the browse view during the first media consumption session, listing information associated with the identified one or more media programs. Step 1012 may be performed in any of the ways described herein.

Turning to the method 1100 illustrated in FIG. 11, in step 1102, a media service provider system provides a browse view for display on a display screen associated with a user during a first media consumption session. In some examples, the browse view is configured to display listing information associated with a plurality of media programs provided by a media program distribution service. Step 1102 may be performed in any of the ways described herein.

In step 1104, the media service provider system detects user input provided by the user and representative of an indication that the user plans to consume at least one media program during a second media consumption session that is subsequent to the first media consumption session. Step 1104 may be performed in any of the ways described herein.

In step 1106, the media service provider system identifies one or more media programs that are available for consumption by the user during the second media consumption session, such as described herein. The one or more media programs may include at least one of a first media program available for vending by way of a physical media distribution channel provided by the media program distribution service and a second media program available for on-demand access by way of a digital media distribution channel provided by the media program distribution service. Step 1106 may be performed in any of the ways described herein.

In step 1108, the media service provider system presents, within the browse view during the first media consumption session, listing information associated with the identified one or more media programs. Step 1108 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 12:
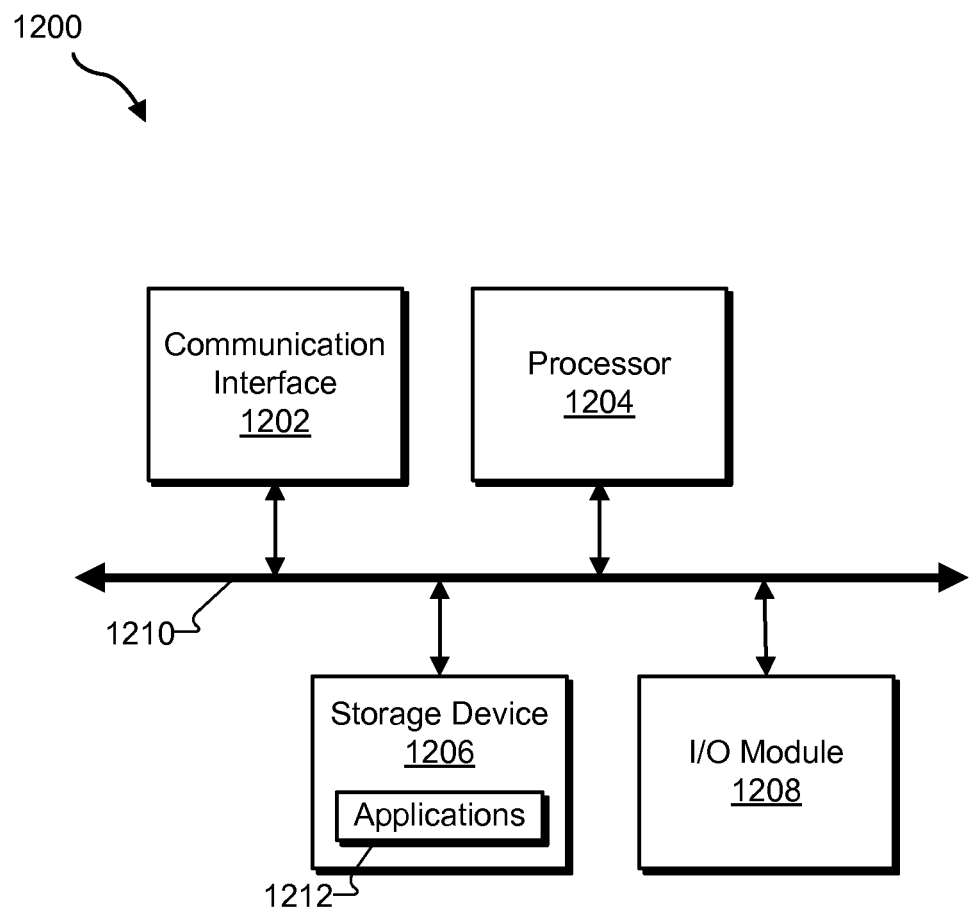
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output (I/O) module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, and any other suitable interface. In at least one embodiment, communication interface 1202 may provide a direct connection between system 100 and one or more provisioning systems via a direct link to a network, such as the Internet. Communication interface 1202 may additionally or alternatively provide such a connection through, for example, a local area network (such as an Ethernet network), a personal area network, a telephone or cable network, a satellite data connection, a dedicated URL, or any other suitable connection. Communication interface 1202 may be configured to interface with any suitable communication media, protocols, and formats, including any of those mentioned above.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1200. For example, one or more applications 1212 residing within storage device 1206 may be configured to direct processor 1204 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
providing, by a media service provider system, a browse view for display on a display screen associated with a user during a first media consumption session, the browse view configured to display listing information associated with a plurality of media programs provided by a media program distribution service;

detecting, by the media service provider system, a selection by the user of a planning option, the selection of the planning option indicating that the user plans to consume at least one media program included in the plurality of media programs during a second media consumption session that is subsequent to the first media consumption session;

presenting, by the media service provider system in response to the selection by the user of the planning option, a user interface that allows the user to specify one or more parameters associated with the second media consumption session;

detecting, by the media service provider system, user input provided by the user by way of the user interface, the user input specifying the one or more parameters associated with the second media consumption session;

identifying, by the media service provider system based on the one or more parameters specified by the user, one or more media programs included in the plurality of media programs and that are available for consumption by the user during the second media consumption session;

presenting, by the media service provider system within the browse view during the first media consumption session, listing information associated with the identified one or more media programs;

generating, by the media service provider system, a checkout cart associated with the second media consumption session, the checkout cart populated with at least some of the identified one or more media programs;

presenting, by the media service provider system within the browse view during the first media consumption session, the checkout cart together with a notification indicating that another media program included in the identified one or more media programs has been recently returned by an additional user to a media vending kiosk where the at least some of the identified one or more media programs populated in the checkout cart are located;

detecting, by the media service provider system, a selection by the user of a help option that is presented together with the listing information within the browse view; and presenting, by the media service provider system in response to the detecting of the selection by the user of the help option, a selection interface configured to facilitate selection by the user of a first media program included in the identified one or more media programs, the selection interface including comparison information that combines information associated with a second media program and a third media program to describe the first media program to the user.

2. The method of claim 1, wherein:
the one or more parameters comprise a parameter that specifies a time period associated with the second media consumption session;
the detecting of the user input comprises detecting user input that specifies the time period associated with the second media consumption session; and
the identifying comprises identifying one or more media programs that are available for consumption during the specified time period.

3. The method of claim 1, wherein:
the one or more parameters comprise a parameter that specifies an audience that will consume the least one media program during the second media consumption session;
the detecting of the user input comprises detecting user input that specifies the audience; and
the identifying comprises identifying one or more media programs that are available for consumption by the user during the second media consumption session and that are identified as potentially being of interest to the audience.

4. The method of claim 1, wherein:
the one or more parameters comprise a parameter that specifies a mood associated with the second media consumption session;
the detecting of the user input comprises detecting user input that specifies the mood associated with the second media consumption session; and
the identifying comprises identifying one or more media programs that are available for consumption by the user during the second media consumption session and that are associated with the specified mood.

5. The method of claim 1, further comprising preventing, by the media service provider system in response to the user input specifying the one or more parameters, listing information associated with any media program included in the plurality of media programs and that is not available for consumption during the second media consumption session from being presented within the browse view during the first media consumption session.

6. The method of claim 1, further comprising preventing, by the media service provider system in response to the user input specifying the one or more parameters, any media program that is available for consumption by the user during the second media consumption session but that does not comply with the one or more parameters specified by the user from being presented within the browse view during the first media consumption session.

7. The method of claim 1, wherein at least one of the identified one or more media programs is not available for consumption by the user during the first media consumption session.

8. The method of claim 1, wherein the presenting of the listing information includes presenting one or more cover art image objects representing the identified one or more media programs.

9. The method of claim 1, wherein the selection interface further includes content that indicates a degree of relatedness of at least one of the second and third media programs to the first media program.

10. The method of claim 1, further comprising:
determining, by the media service provider system, whether the one or more identified media programs have a rating that satisfies a predetermined minimum threshold; and
preventing, by the media service provider system in response to the determining of the rating, listing information associated with any media program included in the identified one or more media programs and that does not satisfy the predetermined minimum threshold from being presented within the browse view during the first media consumption session.

11. The method of claim 1, further comprising providing, by the media service provider system for display in the browse view, the planning option.

12. The method of claim 1, further comprising providing, by the media service provider system, a polling interface that allows the user to solicit and receive a vote from one or more additional users to assist the user in making a selection between the identified one or more media programs.

13. The method of claim 1, further comprising:
dynamically updating, by the media service provider system, the checkout cart as an additional media program that is not included in the identified one or more media programs becomes available for consumption by the user during the second media consumption session.

14. The method of claim 1, further comprising:
tracking, by the media service provider system, an availability of an additional media program that is not included in the identified one or more media programs; and
providing, by the media service provider system, an additional notification to the user when the additional media program becomes available for consumption by the user during the second media consumption session.

15. The method of claim 1, embodied as computer-executable instructions on at least one non-transitory computer-readable medium.

16. The method of claim 1, wherein the information associated with the second media program includes a title of the second media program and the information associated with the third media program includes a title of the third media program.

17. A method comprising:
providing, by a media service provider system, a browse view for display on a display screen associated with a user during a first media consumption session, the browse view configured to display listing information associated with a plurality of media programs provided by a media program distribution service;
detecting, by the media service provider system, user input provided by the user and representative of an indication that the user plans to consume at least one media program included in the plurality of media programs during a second media consumption session that is subsequent to the first media consumption session;
identifying, by the media service provider system based on the user input, one or more media programs included in the plurality of media programs and that are available for consumption by the user during the second media consumption session, the one or more media programs comprising at least one of a first media program available for vending by way of a physical media distribution channel provided by the media program distribution service and a second media program available for on-demand access by way of a digital media distribution channel provided by the media program distribution service;
presenting, by the media service provider system within the browse view during the first media consumption session, listing information associated with the identified one or more media programs;
generating, by the media service provider system, a checkout cart associated with the second media consumption session, the checkout cart populated with at least some of the identified one or more media programs;
presenting, by the media service provider system within the browse view during the first media consumption session, the checkout cart together with a notification indicating that another media program included in the identified one or more media programs has been recently returned by an additional user to a media vending kiosk where the at least some of the identified one or more media programs populated in the checkout cart are located;
detecting, by the media service provider system, a selection by the user of a help option that is presented together with the listing information within the browse view; and
presenting, by the media service provider system in response to the detecting of the selection by the user of the help option, a selection interface configured to facilitate selection by the user of a first media program included in the identified one or more media programs, the selection interface including comparison information that combines information associated with a second media program and a third media program to describe the first media program to the user.

18. The method of claim 17, further comprising preventing, by the media service provider system, listing information associated with any media program included in the plurality of media programs and that is not available for consumption during the second media consumption session from being presented within the browse view during the first media consumption session.

19. The method of claim 17, embodied as computer-executable instructions on at least one non-transitory computer-readable medium.

20. A system comprising:
at least one physical computing device that includes a processor and that:
provides a browse view for display on a display screen associated with a user during a first media consumption session, the browse view configured to display listing information associated with a plurality of media programs provided by a media program distribution service;
detects a selection by the user of a planning option, the selection of the planning option indicating that the user plans to consume at least one media program included in the plurality of media programs during a second media consumption session that is subsequent to the first media consumption session;
presents, in response to the selection by the user of the planning option, a user interface that allows the user to specify one or more parameters associated with the second media consumption session;
detects user input provided by the user by way of the user interface, the user input specifying the one or more parameters associated with the second media consumption session;
identifies, based on the one or more parameters specified by the user, one or more media programs included in the plurality of media programs and that are available for consumption by the user during the second media consumption session;
presents, within the browse view during the first media consumption session, listing information associated with the identified one or more media programs;
generates a checkout cart associated with the second media consumption session, the checkout cart populated with at least some of the identified one or more media programs;
presents, within the browse view during the first media consumption session, the checkout cart together with a notification indicating that another media program included in the identified one or more media programs has been recently returned by an additional user to a media vending kiosk where the at least some of the identified one or more media programs populated in the checkout cart are located;

detects a selection by the user of a help option that is presented together with the listing information within the browse view; and presents, in response to the detection of the selection by the user of the help option, a selection interface configured to facilitate selection by the user of a first media program included in the identified one or more media programs, the selection interface including comparison information that combines information associated with a second media program and a third media program to describe the first media program to the user.

* * * * *